(12) United States Patent
Daigle

(10) Patent No.: US 8,184,538 B2
(45) Date of Patent: *May 22, 2012

(54) REGULATING NETWORK SERVICE LEVELS PROVIDED TO COMMUNICATION TERMINALS THROUGH A LAN ACCESS POINT

(75) Inventor: Brian Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/821,260

(22) Filed: Jun. 22, 2007

(65) Prior Publication Data

US 2008/0316960 A1 Dec. 25, 2008

(51) Int. Cl.
*H04J 13/06* (2006.01)

(52) U.S. Cl. ............... 370/235; 370/351; 370/468

(58) Field of Classification Search .......... 370/235, 370/351, 468
See application file for complete search history.

(56) References Cited

U.S. PATENT DOCUMENTS

| | | | | |
|---|---|---|---|---|
| 6,404,885 | B1 * | 6/2002 | Field et al. | 379/266.04 |
| 6,721,554 | B2 * | 4/2004 | Gnesda et al. | 455/406 |
| 6,754,223 | B1 * | 6/2004 | Lussier et al. | 370/412 |
| 6,915,345 | B1 * | 7/2005 | Tummala et al. | 709/225 |
| 6,917,628 | B2 * | 7/2005 | McKinnin et al. | 370/468 |
| 6,940,824 | B2 * | 9/2005 | Shibutani | 370/252 |
| 7,299,284 | B2 * | 11/2007 | McKinnon et al. | 709/225 |
| 7,496,102 | B2 * | 2/2009 | Chow et al. | 370/400 |
| 7,564,852 | B2 * | 7/2009 | Das et al. | 370/395.41 |
| 7,620,006 | B2 * | 11/2009 | Olariu et al. | 370/322 |
| 7,634,278 | B2 * | 12/2009 | Takayanagi et al. | 455/452.2 |
| 7,639,612 | B2 * | 12/2009 | McEwen | 370/231 |
| 7,681,179 | B2 * | 3/2010 | Travison et al. | 717/120 |
| 2002/0065907 | A1 * | 5/2002 | Cloonan et al. | 709/223 |
| 2002/0072333 | A1 * | 6/2002 | Gnesda et al. | 455/67.1 |
| 2002/0075844 | A1 * | 6/2002 | Hagen | 370/351 |
| 2002/0188562 | A1 * | 12/2002 | Igarashi et al. | 705/40 |
| 2004/0242193 | A1 * | 12/2004 | Olah | 455/406 |
| 2005/0018637 | A1 * | 1/2005 | Karoubalis et al. | 370/338 |
| 2005/0027851 | A1 * | 2/2005 | McKeown et al. | 709/224 |
| 2006/0056382 | A1 * | 3/2006 | Yamada et al. | 370/349 |
| 2006/0109833 | A1 * | 5/2006 | Uh et al. | 370/346 |
| 2006/0120282 | A1 * | 6/2006 | Carlson et al. | 370/229 |
| 2006/0218302 | A1 * | 9/2006 | Chia et al. | 709/245 |
| 2007/0002897 | A1 * | 1/2007 | Goshen et al. | 370/468 |
| 2007/0106808 | A1 * | 5/2007 | Vemula et al. | 709/230 |
| 2007/0198627 | A1 * | 8/2007 | Bozionek et al. | 709/201 |
| 2007/0233883 | A1 * | 10/2007 | De Lutiis et al. | 709/229 |
| 2007/0258361 | A1 * | 11/2007 | McEwen | 370/229 |
| 2008/0009265 | A1 * | 1/2008 | Fernandez-Alonso et al. | 455/411 |

(Continued)

*Primary Examiner* — Chirag Shah
*Assistant Examiner* — Jay P Patel
(74) *Attorney, Agent, or Firm* — Myers Bigel Sibley & Sajovec

(57) ABSTRACT

Network services provided by network access points to a plurality of communication terminals are regulated. Subscriber information that defines which of a plurality of network service levels is allocated to the communication terminals is maintained by at least one network service provider system. Network service levels that are provided by the network access points to the communication terminals are regulated in response to the subscriber information. A network access point may thereby be regulated to provide different levels of network service to different communication terminals. Moreover, a communication terminal may obtain a level of network service that may be based upon that provided by a home network service provider with which it is registered while the communication terminal is roaming through a different network service provider.

19 Claims, 4 Drawing Sheets

U.S. PATENT DOCUMENTS

| | | | |
|---|---|---|---|
| 2008/0049639 A1* | 2/2008 | Wiley et al. | 370/252 |
| 2008/0062988 A1* | 3/2008 | Daigle | 370/392 |
| 2008/0215749 A1* | 9/2008 | Bala et al. | 709/233 |
| 2009/0010264 A1* | 1/2009 | Zhang | 370/395.21 |
| 2009/0282236 A1* | 11/2009 | Hallenstal et al. | 713/151 |

* cited by examiner

| Subscriber Account Database 123a/b | | | | | | |
|---|---|---|---|---|---|---|
| Subscriber Account No. | Communication Terminals | Bandwidth Allocation | VoIP | IPTV | IP Gaming | Roam |
| Subscriber 1 | MAC Address 1 | Level 1 | Yes | Yes | Yes | Yes |
| | MAC Address 2 | Level 1 | Yes | Yes | Yes | Yes |
| | ⋮ | ⋮ | ⋮ | ⋮ | ⋮ | ⋮ |
| Subscriber 2 | MAC Address 3 | Level 2 | Yes | Yes | Yes | Yes |
| | MAC Address 4 | Level 2 | Yes | Yes | Yes | Yes |
| | MAC Address 5 | Level 3 | No | No | No | No |
| | ⋮ | ⋮ | ⋮ | ⋮ | ⋮ | ⋮ |
| ⋮ | | | | | | |

*Figure 3*

REGULATING NETWORK SERVICE LEVELS PROVIDED TO COMMUNICATION TERMINALS THROUGH A LAN ACCESS POINT

FIELD OF THE INVENTION

This invention relates to communication networks and, more particularly, to controlling communications through a wireless local area network access point with communication terminals.

BACKGROUND OF THE INVENTION

Wide area networks are used for intrastate, interstate, and worldwide communication of voice, video, and other data between networked communication devices. Such traffic is increasingly being carried as packets across packet networks, such as the Internet. To access such networks, a user obtains a fee-based subscription to a subscriber communication line to, for example, the user's premises from a network service provider. The subscriber line may be, for example, a Digital Subscriber Line (DSL) and/or a digital cable (e.g., digital television and data cable). The user may connect one or more communication devices through a local area network (LAN) access point, such as a wireless LAN access point, and a modem to the subscriber line. The LAN access point thereby interfaces the communication devices to the subscriber line and, therethrough, to the wide area communication network, such as the Internet.

A network service provider may provide various fee-based services through the subscriber line to subscribers, which can include Internet access, Voice over Internet Protocol (VoIP) telephony, IP television (IPTV) (e.g., television content delivered via the Internet), and/or IP gaming (e.g., interactive gaming between various game consoles across the Internet). Such applications can have widely varying packet communication bandwidth characteristics and needs.

Some network service providers allocate different levels of bandwidth to subscriber lines based on tiered service plans, and constrain traffic through those subscriber lines to no more than the allocated bandwidths. While some bandwidth levels may be sufficient for some applications, such as Web browsing, they may be not be sufficient to provide an acceptable quality of service for real-time VoIP calls, IPTV, or IP gaming.

SUMMARY OF THE INVENTION

A network service provider may regulate the levels of network service that are provided through a WLAN access point to communication terminals. The WLAN access point can be regulated to provide different network service levels to different communication terminals. Moreover, a communication terminal may obtain a level of network service that may be based upon, and may be the same as, that provided by a home network service provider with which it is registered, while the communication terminal is roaming through a different network service provider. Enabling differing network service levels to be provided through a LAN access point to different communication terminals may enable more efficient use of the LAN access point's bandwidth. Moreover, selectively providing various network service levels to roaming communication terminals may serve to reduce the geographic constraints on such access as a communication terminal roams through one or more coverage areas of LAN access points serviced by other network service providers.

Accordingly, some embodiments of the present invention regulate network services that are provided by network access points to a plurality of communication terminals. Subscriber information that defines which of a plurality of network service levels is allocated to the communication terminals is maintained by at least one network service provider system. Network service levels that are provided by the network access points to the communication terminals are regulated in response to the subscriber information. For example, an access request may be received from a communication terminal at a network access point of a first network subscriber who has registered with the first network service provider system to receive a first network service level. A determination is made that the communication terminal is associated with a second network subscriber who has registered with a second network service provider system and is allocated a second network service level. The network access point is then regulated to provide the second network service level to the communication terminal.

Some other embodiments are directed to a network service provider system that includes at least one subscriber account database and an access controller. The subscriber account database maintains subscriber information that identifies which of a plurality of network service levels is allocated to one or more communication terminals of a plurality of subscribers. The subscriber information allocates a first network service level to a first communication terminal of a first subscriber and allocates a second network service level to a second communication terminal of a second subscriber. The access controller controls a network access point in response to the subscriber information to provide the first network service level to the first communication terminal and to provide the second network service level to the second communication terminal.

Some other embodiments are directed to a network access point that includes a registration controller, a bandwidth allocation controller, and a bandwidth enforcement controller. The registration controller receives access requests from communication terminals, communicates the access requests to a network service provider system, and receives network service level information from the network service provider system in response to the access requests. The bandwidth allocation controller allocates different levels of maximum communication bandwidth to different communication terminals communicating with the network access point in response to the network service level information. The bandwidth enforcement controller limits communications between the network access point and each of the communication terminals to no more than the allocated levels of maximum communication bandwidth.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 3 is a table that illustrates an exemplary subscriber account database which may reside in each of the network service providers of FIG. 1 according to some embodiments of the present invention.

DETAILED DESCRIPTION

Figure 1:
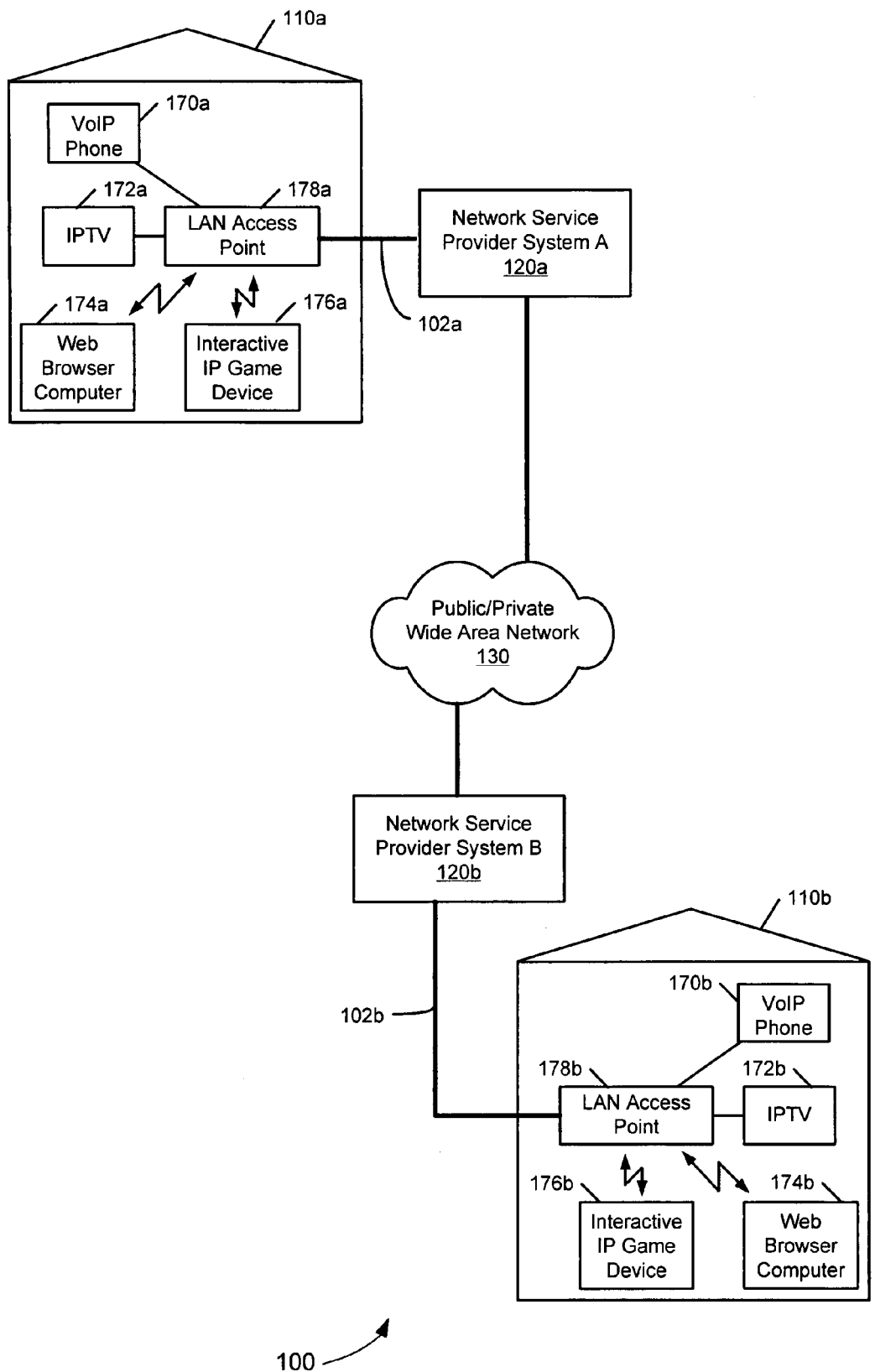
FIG. 1 is a block diagram of systems, methods, and/or computer program products in which two network service providers regulate network services provided by LAN access points to communication terminals according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

It should also be noted that in some alternate implementations, the functions/acts noted in the blocks may occur out of the order noted in the block diagrams and/or flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of systems, methods, and/or computer program products in which two network service providers regulate network services provided by LAN access points to communication terminals according to some embodiments of the present invention. As shown in FIG. 1, a communication system 100 can include a plurality of network service provider systems A and B 120a-b ("service provider A 120a" and "service provider B 120b") and a public/private wide-area network 130. Users may subscribe to fee-based services provided by the service providers A and B 120a-b to access the wide-area network 130, such as from the users' premises (e.g., home, office, etc.). For example, a first subscriber has first subscriber equipment 110a that is networked to the wide area network 130 through a subscriber line 102a which is operated by the service provider A 120a. Similarly, a second subscriber has second subscriber equipment 110b that is networked to the wide area network 130 through a subscriber line 102b which is operated by the service provider B 120b.

The subscriber equipment 110a can include a plurality of end user communication terminals, such as, for example, a VoIP phone 170a, an IPTV 172a, a web browser hosted on a computer 174a (e.g., laptop/desktop/palmtop/PDA computer), and an interactive IP game device 176a, each of which may be connected through a network access point 178a to the subscriber line 102a. The network access point 178a may be a LAN access point, such as a wireless LAN (e.g., 802.11b-g), that aggregates signals from the communication terminals 170a-176a and communicates packetized data through a digital modem, such as a Digital Subscriber Line (DSL) modem and/or a digital cable modem, and the subscriber line 102a. The digital modem may be at least partially within the network access point 178a or may be separate therefrom (e.g., connected between the network access point 178a and the subscriber line 102a).

The VoIP phone 170a is configured to convert voice into digital packets which are communicated through a VoIP service unit, which may reside in the service provider A 120a or across the wide area network 130, to another VoIP phone and/or to a plain old telephone system (POTS) phone. The VoIP service unit may convert the digital VoIP packets into analog signals which can be communicated through a Public Switched Telephone Network (PSTN) to a POTS phone. Accordingly, the VoIP phone 170a may be embodied using an VoIP analog telephone adapter, a specialized IP phone and/or a hardware/software module hosted on a general purpose computer.

The IPTV 172a may be configured as an interactive on-demand TV through which a user can select among a plurality of TV programs hosted on a IPTV video server, which may reside in the service provider A 120a or across the wide-area network 130, to be displayed on the IPTV 172a. The IP gaming device 176a may be configured as a software module hosted on a general purpose computer and/or as a specialized gaming console that shares data and/or program instructions with other IP gaming devices and/or with a gaming server via the service provider A 120a and the wide area network 130.

The VoIP phone 170a, the IPTV 172a, the web browsing computer 174a, and the IP gaming device 176a can have significantly different packet data communication bandwidth characteristics and needs. For example, the IP gaming device 176a and the IPTV 172a may transmit/receive real-time high-bandwidth packetized video streams through the subscriber line 102a. In contrast, the VoIP phone 170a may transmit/receive lower-bandwidth real-time packetized voice streams through the subscriber line 102a. The Web browser computer 174a may transmit/receive yet lower-bandwidth non-real-time packetized data through the subscriber line 102a.

The subscriber equipment 110b may contain the same type of communication terminals (e.g., 170a-176a) as was described for customer premises 110a, and which may be networked to the wide area network 130 through a network access point 178b and the subscriber line 102b. Accordingly, the communication terminals 170b-176b may be configured to operate the same as described herein for the communication terminals 170a-176a. The network access point 178b may be configured to operate the same as the network access point 178a. The wide area network 130 may include the Internet and/or other packet switched networks, and may include a combination of one or more wired and/or wireless packet switched networks.

Service providers A and B 120a-b may each offer different tiers of network services to subscribers. For example, the service providers A and B 120a-b may each offer subscribers various different tiers of maximum communication bandwidth, prioritization of communication bandwidth for one subscriber/communication terminal over another, and/or different network services including, but not limited to, VoIP telephony services, IPTV services, Internet access, and/or IP gaming services. Accordingly, subscribers may obtain, by fee-based subscriptions, various network service levels from the service providers A and B 120a-b.

Moreover, in accordance with some embodiments, a network service provider system may be configured to regulate network access points to provide different network service levels to different communication terminals. For example, service provider A 120a may regulate the network access point 178a to provide different network service levels to one or more of the communication terminals 170a-176a.

Service provider A 120a may allow a subscriber to register different ones of the communication terminals 170a-176a to be allocated different network service levels, such as, different maximum communication bandwidths and/or different network services including, but not limited to, VoIP telephony services, IPTV services, Internet access, and/or IP gaming services. Such subscriber information may be stored within a subscriber account database in service provider A 120a.

Service provider A 120a may then allow a registered communication device to obtain the registered level of network service while within the coverage area of the network access point 178a of the subscriber, or while within the coverage area of another network access point of another subscriber of the service provider A 120a. Moreover, service providers A and B 120a-b may cooperate to provide the same, or some other level of, network service level to a communication terminal which is registered with service provider A 120a while the communication terminal is within the coverage area of the network access point 178b serviced by the other service provider B 120b, and/or vice versa. Accordingly, a subscriber may roam through the coverage areas of network access points serviced by either of the service providers A and B 120a-b while obtaining the registered level of network service.

Figure 2:
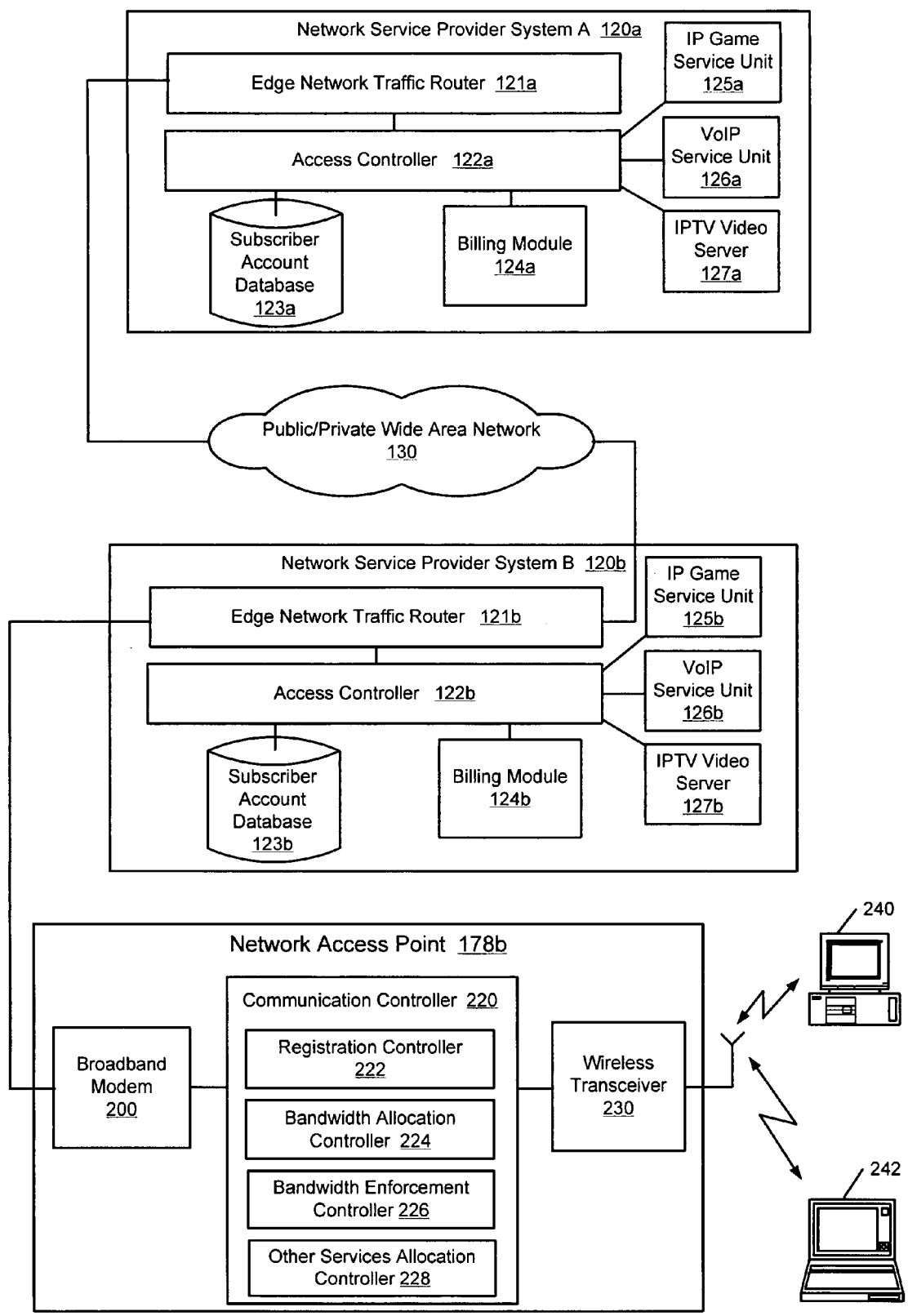
FIG. 2 is a block diagram of the network service providers and one of the network access points of FIG. 1 which are configured according to some embodiments of the present invention.

FIG. 2 is a block diagram of service providers A and B 120a-b and the network access point 178b of FIG. 1, and which are configured according to some embodiments of the present invention. Referring to FIG. 2, service provider B 120b may include an edge network traffic router 121b, an access controller 122b, a subscriber account database 123b, a billing module 124b, an IP service unit 125b, a VoIP service unit 126b, and an IPTV video server 127b. Service provider A 120a may include an edge network traffic router 121a, an access controller 122a, a subscriber account database 123a, a billing module 124a, an IP service unit 125a, a VoIP service unit 126a, and an IPTV video server 127a, which may operate in the same manner as described herein for the same labeled components of the service provider B 120b.

The edge network traffic router 121b is configured to interface a network access point to the wide area network 130. The edge network traffic router 121b may include a DSL Access Multiplexer (DSLAM) device and/or a digital cable line access module that may reside as part of a digital loop carrier that aggregates signals from one or more network access points on a high-speed communications backbone line of the wide area network 130.

The subscriber account database 123b maintains subscriber information that identifies which of a plurality of network service levels is allocated to one or more communication terminals of a plurality of subscribers. FIG. 3 is an exemplary table that may illustrate a portion of the subscriber account database 123b. With reference to FIG. 3, the subscriber account database 123b may associate subscriber account numbers/identifier (e.g., subscriber 1, subscriber 2, etc.) with communication terminals (e.g., terminals 170b-176b and/or 170a-176a) that are registered for each subscriber, may allocate bandwidth levels to each communication terminal, and may authorize/deny use of defined network services, such as VoIP service, IPTV service, and/or IP gaming service by the associated communication terminals. The communication terminals may be identified by a MAC address (media access control address) associated with a LAN transceiver, such as a wireless LAN transceiver, in each of the communication terminals. The MAC address is a unique identifier that may be assigned to LAN interface circuits and used during network communications to identify the communicating terminal. Moreover, the subscriber account database 123b may also identify which of the communication terminals are authorized to obtain the defined network service levels while roaming within the coverage area of a network access point of services by another service provider, such as while within the coverage area of network access point 178a serviced by service provider A 120a.

By way of further example, Subscriber 1 is registered in the subscriber account database 123b to obtain network services from service provider B 120b for two identified communication terminals having MAC address 1 and MAC address 2. The communication terminals having MAC address 1 and MAC address 2 are both allocated a level 1 maximum communication bandwidth, and are granted access to VoIP services, IPTV services, IP gaming services, and the ability to obtain these network services while roaming among one or more network access points that are serviced by service provider A 120a. Subscriber 2 is registered in the subscriber account database 123b to obtain network services from service provider B 120b for three identified communication terminals having MAC addresses 3, 4, and 5. The communication terminal having MAC address 3 is allocated a level 2 maximum communication bandwidth (which may be less than level 1), and is granted access to VoIP services, IPTV services, IP gaming services, and the ability to obtain these network services while roaming among one or more network access points that are serviced by service provider A 120a. In contrast, the communication terminal having MAC address 5 is allocated a level 3 maximum communication bandwidth (which may be less than level 2), and is denied access to VoIP services, IPTV services, IP gaming services, and the ability to obtain these network services while roaming among one or more network access points that are serviced by service provider A 120a.

The access controller 122b regulates the network services provided by network access points to communication terminals in response to the subscriber information contained in the subscriber account database 123b. The access controller 122b may regulate the maximum communication bandwidth and/or may selectively allow/deny access to VoIP services, IPTV services, and/or IP gaming services, which may be provided by a VoIP service unit 126b, an IPTV video server 127b, and an IP game service unit 125b, respectively, within the network service provider system B or connected thereto through the wide area network 130.

For example, as shown in FIG. 2, the access controller 122b regulates the network services provided by the network access point 178b to communication terminals 240 and 242 in response to the subscriber information. The network access point 178b may be, for example, a digital subscriber line (DSL)/digital cable wireless LAN (WLAN) access point (e.g., WLAN router). The communication terminals 240 and 242 may include one or more of the communication terminals 170b-176b and/or the communication terminals 170a-176a.

The network access point 178b includes a broadband modem 200, a communication controller 220, and a wireless transceiver 230. The broadband modem 200 is configured to bidirectionally communicate with the wide area network 130 through the edge network traffic router 121b. The wireless transceiver 230 is configured to communicate across an air interface with the communication terminals 240 and 242 according to one or more wireless LAN protocols, which may include, but are not limited to, IEEE 802.11a-g. The communication controller 220 is configured to receive network service level information for the communication terminals 240 and 242, and to regulate the level of network service provided to the communication terminals 240 and 242 in response thereto.

The communication controller 220 may include a registration controller 222, a bandwidth allocation controller 224, a bandwidth enforcement controller 226, and a services allocation controller 228. Although the controllers 222, 224, 226, and 228 have been illustrated as separate blocks for ease of explanation, is to be understood that their functionality may be combined within a single data processing element (e.g., a microprocessor executing software code) or distributed across a plurality of data processing elements. Further operation of the network access point 178b and service providers A and B 120a-b that provide a registered network service level to a roaming communication terminal will now be described with regard to the signal flowchart of FIG. 4.

For purposes of explanation only, communication terminal 240 is understood to be registered with the service provider A 120a and has subscriber information defined in the subscriber account database 123a. In contrast, communication terminal 242 is understood to be registered with the service provider B 120b and has subscriber information defined in the subscriber account database 123b. Both of the communication terminals 240 and 242 are with the communication coverage area of the network access point 178b. Accordingly, communication terminal 242 may access the wide area network 130 through its home service provider B 120b, while the communication terminal 240 may attempt to obtain access to the wide area network 130 while roaming through the service provider B 120b.

Figure 4:
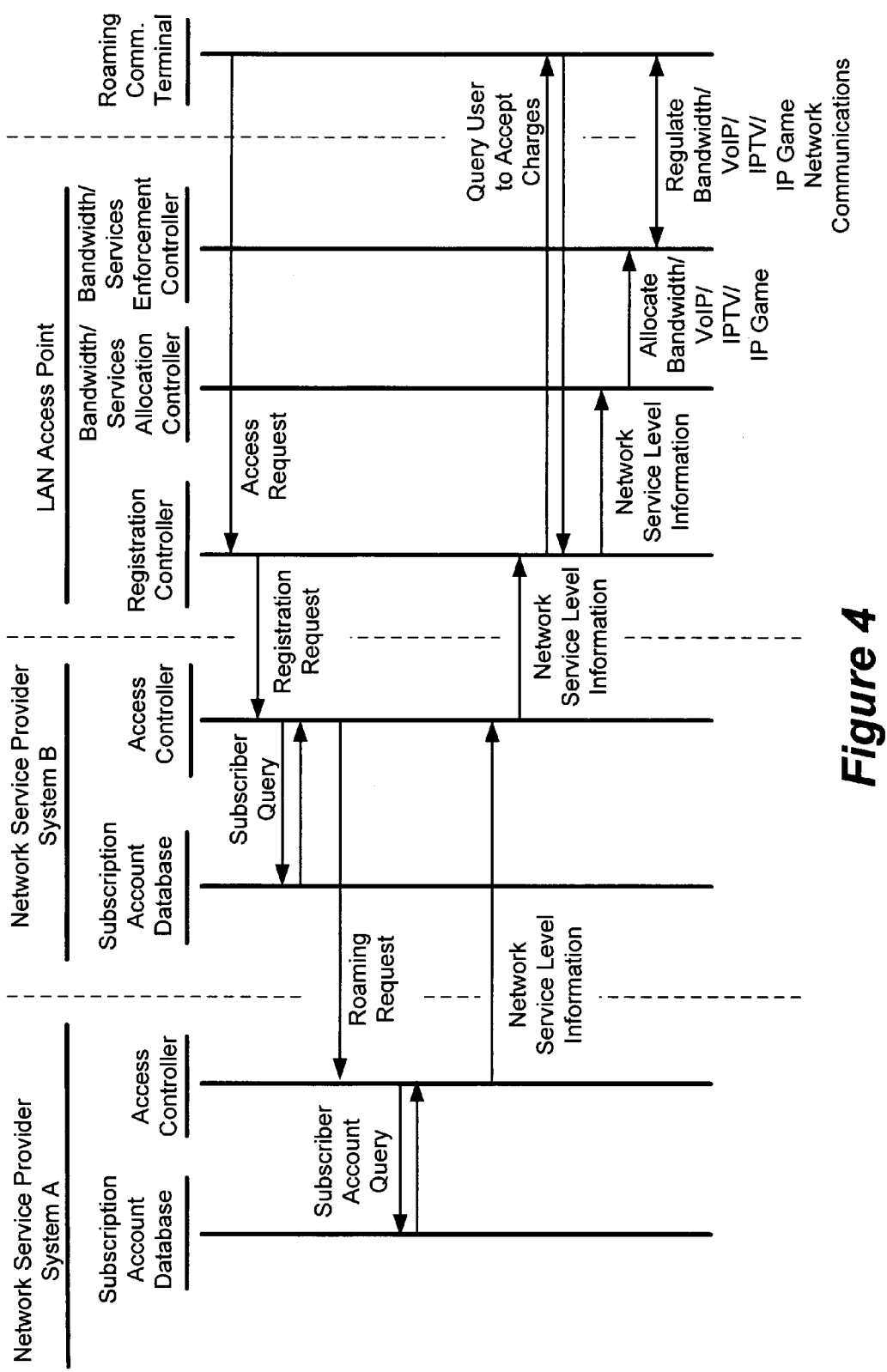
FIG. 4 is a signal flowchart that illustrates data flow and associated methods and computer program products for regulating network services provided by LAN access points to communication terminals according to some embodiments of the present invention.

Referring to FIG. 4, communication terminal 240 generates an access request that is received by the registration controller 222 via the wireless transceiver 230. The registration controller 222 identifies the MAC address associated with the WLAN transceiver of communication terminal 240, and forwards the identified MAC address as part of a registration request to the access controller 122b of service provider B 120b. The access controller 122b queries the subscriber account database 123b in an attempt to determine the network service level allocated to the communication terminal 240. However, the access controller 122b determines from the query that the communication terminal 240 is registered with another service provider (e.g., determines that the identified MAC address is not registered within the subscriber account database 123b).

The access controller 122b of service provider B 120b then generates a roaming request to the access controller 122a of service provider A 120a to attempt to determine the network service level allocated to the communication terminal 240. The access controller 122a queries the subscriber account database 123b and obtains therefrom network service level information allocated to the communication terminal 240. The access controller 122a of service provider A 120a communicates the network service level information to the access controller 122b of service provider B 120b, which forwards the network service level information to the registration controller 222 of the network access point 178b.

In response to the received network service level information, the registration controller 222 may generate a query message which is displayed to the user of the communication terminal 240 to confirm that the user will pay additional roaming charges that will be incurred to obtain network services while roaming within the coverage area of network access point 178b. The registration controller 222 may then selectively grant/deny network services to the communication terminal 240 based on the user's response to the query. The billing module 124b can track such roaming charges for direct billing to the subscriber, or may pass along such charges to the billing module 124a of the service provider A 120a with whom the subscriber is registered.

When network access is granted, and the received network service level information identifies an authorized bandwidth level, the bandwidth allocation controller 224 allocates a maximum communication bandwidth level to the communication terminal 242 based on the received network service level information. The bandwidth allocation controller 224 may prioritize, at a higher priority level, providing bandwidth to communication terminals having MAC addresses that are registered to the subscriber of the subscriber line 102b which interconnects the network access point 178b to the system B 120b (e.g., the home communication terminal 240). Thus, for example, the bandwidth allocation controller 224 may allocate excess bandwidth that is not otherwise used by the subscriber's home communication terminals (e.g., communication terminal 242) for use by roaming communication terminals (e.g., communication terminal 240).

The bandwidth enforcement controller 226 constrains the communication bandwidth between the network access point 178b and the communication terminals 240 and 242 in response to bandwidth allocations by the bandwidth allocation controller 224. Accordingly, the communication terminal 240 may be granted roaming access to the wide area network 130 through the service provider B 120b, but may be limited to no more than a maximum communication bandwidth that is defined by subscriber information in the subscriber account database 123a of the home service provider A 120b, and that maximum communication bandwidth may be further constrained so as to ensure adequate bandwidth allocation to the home communication terminal 242.

Moreover, it is noted, that the access point 178b may provide a first bandwidth communication level to the communication terminal 240 while receiving the access request and establishing a network connection therebetween, and may subsequently provide a second bandwidth communication level to the communication terminal 240 pursuant to the subscriber information. The registration controller 222 may maintain a list of communication terminals that it knows are registered with service provider B 120b, so as to allow it to process access requests at least partially independently of service provider B 120b. The bandwidth allocation controller 224 may maintain subscriber information defining which of a plurality of different network service levels it knows are allocated to each of the registered communication terminals.

When the received network service level information authorizes the communication terminal 240 to have defined network communication services, the services allocation controller 228 may make one or more of those defined network communication services available for use by the communication terminal 240. For example, the services allocation controller 228 may selectively allow/deny use of VoIP services, IPTV services, and/or IP gaming services by the communication terminal 240 while roaming within the coverage area of network access point 178b.

Accordingly, in some embodiments of the present invention, a network service provider may regulate the levels of network service that are provided through a network access point to communication terminals. Different communication terminals can be allocated different levels of network service. Moreover, a communication terminal may obtain a level of network service that may be based upon, and may be the same as, that provided by a home network service provider with which it is registered while the communication terminal is roaming through a different network service provider. Enabling differing network service levels to be provided through a network access point to different communication terminals may enable more efficient use of the network access point's bandwidth. Moreover, selectively providing various network service levels to roaming communication terminals may serve to reduce the geographic constraints on such access as a communication terminal roams through one or more coverage areas of network access points serviced by other network service providers.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of regulating network services provided by network access points to a plurality of communication terminals, the method comprising:
    maintaining, by at least one network service provider system, subscriber information defining which of a plurality of network service levels is allocated to the communication terminals;
    regulating network service levels provided by the network access points to the communication terminals in response to the subscriber information; and
    determining that a communication terminal is roaming by receiving from the communication terminal an access request at a network access point of a first network subscriber who has registered with the at least one network service provider system to receive a first network service level;
    determining that the communication terminal is associated with a second network subscriber who has registered with the at least one network service provider system and is allocated a second network service level;
    obtaining information identifying the second network service level from subscriber information maintained by the second network service provider system; and
    regulating the network access point of the first network subscriber to provide the second network service level to the communication terminal, comprising allocating excess bandwidth that is not otherwise used by one or more home communication terminals of the second network subscriber.

2. The method of claim 1, wherein:
    the at least one network service provider system comprises an Internet service provider system;
    the network access point comprises a wireless local area network access point; and
    the wireless local area network access point is regulated to provide Internet communications to the communication terminal according to the second network service level.

3. The method of claim 1, wherein regulating network service levels provided by the network access points comprises:

regulating communication bandwidth levels provided by each of the network access points to each of the communication terminals in response to the subscriber information.

4. The method of claim 3, wherein:
the subscriber information allocates a first level of maximum communication bandwidth to a first communication terminal of a first subscriber and a second level of maximum communication bandwidth, which is different from the first level, to a second communication terminal of a second subscriber; and
the network access point is regulated in response to the subscriber information to provide the second level of maximum communication bandwidth to the second communication terminal of the second subscriber and to provide the first level of maximum communication bandwidth to first communication terminal of the first subscriber.

5. The method of claim 4, further comprising:
regulating the network access point to prioritize providing the first level of maximum communication bandwidth to the first communication terminal at a higher priority than providing the second level of maximum communication bandwidth to the second communication terminal in response to the subscriber information indicating that the first communication terminal and a subscriber network access line, which connects the network access point to the at least one network service provider, are both registered to the first subscriber.

6. The method of claim 4, further comprising:
regulating the network access point to provide the first level of maximum communication bandwidth to the second communication terminal while receiving the access request therefrom; and
after granting access to the second communication terminal to communicate through the network access point to a wide area network, regulating the network access point to provide the second level of maximum communication bandwidth to the second communication terminal in response to the subscriber information.

7. The method of claim 1, wherein:
the subscriber information does not authorize voice over internet protocol service for a first communication terminal of a first subscriber and authorizes voice over internet protocol service for a second communication terminal of a second subscriber; and
the network access point is regulated in response to the subscriber information to allow voice over internet protocol service to the second communication terminal and to deny voice over internet protocol service to the first communication terminal.

8. The method of claim 1, wherein:
the subscriber information does not authorize internet protocol game service for a first communication terminal of a first subscriber and authorizes internet protocol game service for a second communication terminal of a second subscriber; and
the network access point is regulated in response to the subscriber information to allow internet protocol game service to the second communication terminal and to deny internet protocol game service to the first communication terminal.

9. The method of claim 1, further comprising:
receiving from a communication terminal an access request at a network access point of a first network subscriber who has registered with the at least one network service provider system to receive a first network service level; and
determining that the communication terminal is not listed among subscriber information maintained by a first network service provider system that provides wide area network access to the network access point.

10. The method of claim 9, further comprising:
prompting a user of the communication terminal to confirm that the user accepts roaming charges for obtaining the second network service level at the network access point; and
selectively providing the second network service level through the network access point to the communication terminal based on the user's response, via the communication terminal, to the prompt.

11. The method of claim 10, further comprising charging the user through the second network service provider system based on the user's confirmation response, via the communication terminal, to the prompt.

12. The method of claim 1, wherein:
the network service provider systems comprise Internet service provider systems;
the network access point comprises a wireless local area network access point; and
determining that the communication terminal is not listed among subscriber information maintained by a first network service provider system that provides wide area network access to the local area network access point comprises:
identifying a MAC address associated with a wireless local area network transceiver of the communication terminal; and
using the identified MAC address to determine that the communication terminal is not listed among subscriber information maintained by the first network service provider system that provides wide area network access to the wireless local area network access point and to determine that the communication terminal is listed among subscriber information maintained by the second network service provider system.

13. The method of claim 12, further comprising:
maintaining a subscriber account database in the first network service provider system that identifies at least one media access control address of at least one communication terminals registered to a first subscriber and identifies which of the plurality of network service levels are allocated to the media access control address; and
maintaining a subscriber account database in the second network service provider system that identifies at least one media access control address of at least one communication terminals registered to a second subscriber and identifies which of the plurality of network service levels are allocated to the media access control address.

14. A local area network access point comprising:
a registration controller that is configured to receive access requests from communication terminals, to communicate the access requests to a first network service provider system, and to receive network service level information from the first network service provider system in response to the access requests, wherein the registration controller is further configured to determine that a communication terminal, which is requesting access to the local area network access point is not registered with the first network service provider system, and, in response to the determination, to request network service level information from a second network service provider system via the first network service provider system;

a bandwidth allocation controller that is configured to allocate different levels of maximum communication bandwidth to different communication terminals communicating with the local area network access point in response to the network service level information, wherein the bandwidth allocation controller is further configured to obtain information identifying a network service level for the communication terminal from subscriber information maintained by the second network service provider system, and to regulate the network access point to provide the network service level to the communication terminal, comprising allocating excess bandwidth that is not otherwise used by one or more home communication terminals of a network subscriber associated with the communication terminal; and a bandwidth enforcement controller that is configured to constrain communications between the local area network access point and each of the communication terminals to no more than the allocated levels of maximum communication bandwidth, wherein the local area network access point is a subscriber of the first network service provider system.

15. The local area network access point of claim 14, wherein the registration controller is further configured to communicate an access request to the first network service provider system in response to determining that a communication terminal is requesting for a first time establishment of a communication link through with the local area network access point, and to receive from the first network service provider a maximum communication bandwidth level for the communication terminal in response to the access request.

16. The local area network access point of claim 14, wherein:

the registration controller is further configured to maintain a list of communication terminals that are registered with the first network service provider system who is providing wide area network service to the local area network access point; and the bandwidth allocation controller is further configured to maintain subscriber information defining which of the plurality of different network service levels is allocated to each of the registered communication terminals.

17. The local area network access point of claim 14, further comprising a wireless transceiver that is configured to communicate with communication terminals across an air interface according to one or more wireless local area network protocols.

18. The local area network access point of claim 17, wherein the registration controller is further configured to identify a media access control address associated with a wireless local area network transceiver of a communication terminal requesting access to the local area network access point, and to communicate the identified media access control address as part of the access request to the first network service provider system.

19. The local area network access point of claim 18, wherein the bandwidth allocation controller is further configured to allocate different levels of maximum communication bandwidth to different media access control addresses associated with wireless local area network transceivers in different communication terminals.

* * * * *